United States Patent [19]

Doneen et al.

[11] Patent Number: 4,906,837
[45] Date of Patent: Mar. 6, 1990

[54] MULTI-CHANNEL WAVEGUIDE OPTICAL SENSOR

[75] Inventors: Patrick M. Doneen, East Wenatchee; John M. Lindberg, Renton, both of Wash.

[73] Assignee: The Boeing Company, Seattle, Wash.

[21] Appl. No.: 249,601

[22] Filed: Sep. 26, 1988

[51] Int. Cl.⁴ .................................................. H01J 5/16
[52] U.S. Cl. .............................. 250/227.29; 350/96.12
[58] Field of Search ................. 250/227, 231 SE, 566; 350/96.12, 96.13, 96.14; 235/473

[56] References Cited

U.S. PATENT DOCUMENTS

| | | | |
|---|---|---|---|
| 2,881,976 | 4/1959 | Greanias | 235/61 |
| 3,334,538 | 8/1967 | Steinhausen | 88/14 |
| 3,576,430 | 4/1971 | Fickenscher et al. | 235/61.11 |
| 3,585,396 | 6/1971 | Ferguson et al. | 250/227 |
| 3,728,521 | 4/1973 | Borough et al. | 235/61.12 N |
| 3,786,238 | 1/1974 | Heisner | 235/61.11 E |
| 3,792,239 | 2/1974 | Ohlhaber et al. | 235/61.12 N |
| 3,911,270 | 10/1975 | Traub | 250/227 |
| 3,953,730 | 4/1976 | Henry et al. | 250/227 |
| 4,120,588 | 10/1978 | Chaum | 356/106 LR |
| 4,128,759 | 12/1978 | Hunt et al. | 250/199 |
| 4,185,256 | 1/1980 | Scifres et al. | 331/94.5 H |
| 4,318,058 | 3/1982 | Mito et al. | 372/50 |
| 4,356,395 | 10/1982 | Miller | 250/227 |
| 4,379,225 | 4/1983 | Apothaker | 250/227 |
| 4,384,038 | 5/1983 | Khoe et al. | 430/321 |
| 4,418,980 | 12/1983 | Keil et al. | 350/96.13 |
| 4,468,085 | 8/1984 | Papuchon et al. | 350/96.14 |
| 4,480,179 | 10/1984 | Schaefer et al. | 235/473 |
| 4,579,417 | 4/1986 | Ih | 350/96.11 |
| 4,637,681 | 1/1987 | Yamamoto et al. | 350/96.12 |
| 4,737,624 | 4/1988 | Schwarte | 250/227 |

FOREIGN PATENT DOCUMENTS

| | | |
|---|---|---|
| 0193248 | 9/1986 | European Pat. Off. . |
| 59-157611 | 9/1984 | Japan . |
| 61-151602 | 7/1986 | Japan . |
| 2125184 | 2/1984 | United Kingdom . |

OTHER PUBLICATIONS

M. Izutsu et al., "Optical-Waveguide Micro-Displacement Sensor," Aug. 1982.
K. Forrest et al., "Channel Waveguides in Glass via Silver-Sodium Field-Assisted Ion Exchange," Feb. 1986.

Primary Examiner—David C. Nelms
Attorney, Agent, or Firm—Christensen, O'Connor, Johnson & Kindness

[57] ABSTRACT

An optical sensor for monitoring the motion and/or position of a moving element. One preferred embodiment of the optical sensor (50) includes a soda lime silicate glass substrate (52) in which a plurality of transmit waveguide channels (54), (56), and (58) are formed by an ion diffusion process. The waveguide conveys light pulses to a plurality of read ports (60), (62), and (64) through which the pulses are emitted to illuminate reflective areas formed on the surface of an adjacent moving element (59). Pulses of light reflected back from the reflective areas re-enter the read ports, propagating in the opposite direction through combination transmit/receive portions of the optical waveguide channels (72), (74), and (76), combining in a common receive waveguide channel (78). The reflected pulses are conveyed through a receive optical fiber (80) to a fiber-optic receiver (170), where they are converted to electrical pulses, which are decoded to provide an indication of the speed and/or position of the moving element.

20 Claims, 3 Drawing Sheets

MULTI-CHANNEL WAVEGUIDE OPTICAL SENSOR

TECHNICAL FIELD

This invention generally pertains to a sensor for use in an optical system and, more specifically, to an optical sensor for monitoring the position/motion of an adjacent surface.

BACKGROUND OF THE INVENTION

Linear and rotary actuators are frequently equipped with optical sensors to monitor linear or rotational position and velocity of a moving element. The feedback signal provided by an optical sensor has a resolution that partly depends on the number of channels encoded on the surface monitored. The optical sensor head sees light reflected from areas on the moving surface, each series of light (or dark) areas comprising one channel in which the reflected light signals represent bits of data.

Prior art optical sensors have been developed in which light modulated by a pattern of reflecting or absorbing areas is conveyed through a sensor head via bundles of discrete micro-optical fibers. One such device includes 108 bundled fibers for each channel of data. The labor costs associated with producing an optical sensor system using this type of sensor head are relatively high due to the extensive tedious, skilled work required to assemble the bundles of micro-optical fibers required for splitting, routing, and combining transmit/receive channels. Depending on the resolution requirements of the system, typically from 3 to 12 data channels may be needed. Even if the number of separate optical fibers required for transmitting the modulated light is reduced by using, for example, time division multiplexing, the optical sensor may be quite expensive to manufacture.

It is, therefore, an object of this invention to reduce the costs associated with manufacturing an optical sensor. A further object, with respect to such an optical sensor, is to distribute light between channels by combining and/or splitting the light without using optical fiber junctions. Yet a further object is to produce an optical sensor incorporating an integral waveguide having a plurality of optical channels. These and other objects and advantages of the present invention will be apparent from the attached drawings and the description of the preferred embodiments that follows.

SUMMARY OF THE INVENTION

In accordance with the present invention, an optical sensor is provided for sensing data on a surface. The sensor includes "n" transmit optical fibers that are operative to convey light from a source toward the surface, and "m" receive optical fibers that are operative to convey light reflected from the surface to an optical detector. Both "n" and "m" are integers, at least equal to 1. An optical waveguide is also provided, which includes "n" transmit channels for conveying light through the waveguide, each of which are connected to one of the transmit optical fibers. A plurality of receive channels are connected to the "m" receive optical fibers, and each receive channel is joined with one of the transmit channels at a plurality of spaced-apart points through which light from the source exits the waveguide and propagates toward the optically encoded data on the surface. Light reflected back from the surface re-enters the waveguide at the spaced-apart points and is conveyed along the receive channel into the "m" receive optical fibers, for transmission to the optical detector associated with each receive optical fiber.

In one embodiment of the invention, there is only one receive optical fiber. The receive channels are combined so that the light reflected from the surface into each of the receive channels enters the receive optical fiber as a combined data signal.

With respect to another embodiment, the transmit optical fiber and the receive optical fiber comprise a single optical fiber through which light propagates bidirectionally, both from the source and as reflected from the surface. In this embodiment, light propagating from the source through the waveguide is split into a plurality of transmit channels comprising paths connected to the spaced-apart points. Light reflected from the surface re-enters the spaced-apart points and propagates in the opposite direction along said paths, exiting through the common optical fiber. The transmit and return channels thus comprise common channels in the waveguide. While propagating through the waveguide, light from the source may be split asymmetrically between transmit channels, at least once.

As a further aspect of the latter embodiment, time division multiplexing means may be interposed between the spaced-apart points and the surface to introduce different time delays in light reflected from the surface, back into the spaced-apart points. The time division multiplexing means preferably comprise a plurality of optical fiber delay lines.

The spaced-apart points are preferably disposed along one side of the waveguide, proximate the surface, so that the data is monitored as relative motion occurs between the waveguide and the surface. A plurality of lenses may be interposed between the spaced-apart points and the surface. The lenses are operative to collimate or focus the light emerging from the spaced-apart points onto the surface, and to gather reflected from the surface for transmission back into the spaced-apart points. The data on the surface comprise variations in the optical reflectance of portions of the surface.

DESCRIPTION OF THE PREFERRED EMBODIMENTS

Figure 1:
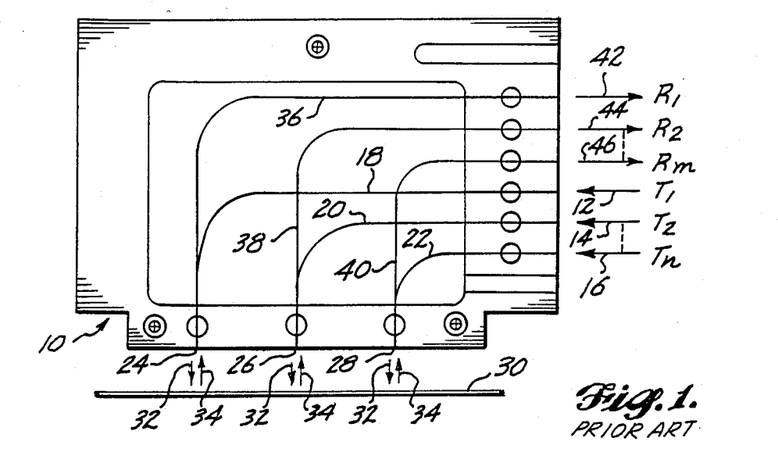
FIG. 1 schematically illustrates a prior art fiber-optic sensor, in which bundles of micro-optical fibers are used.

A prior art optical sensor constructed using bundles of micro-optical fibers is represented schematically in FIG. 1, generally denoted by reference numeral 10.

Optical sensor 10 is coupled to n optical fibers, $T_1$, $T_2$ through $T_n$, identified by reference numerals 12, 14, and 16, respectively. Light pulses are transmitted from a source through each of the n optical fibers to the optical sensor head 10, for transmission through separate bundles of micor-optical fibers 18, 20, and 22. Since in one such device, each of these bundles includes 81 micro-optical fibers, no attempt is made to illustrate discrete fibers inthe bundles of micro-optical fibers; instead, the bundles are shown schematically by the use of solid lines. The bundles of transmit micro-optical fibers 18, 20, and 22 transmit the incoming light pulses to their terminal ends at read ports 24, 26, and 28, where they are randomly mixed with receive micro-optical fibers forming bundles 36, 238, and 40, each bundle comprising 27 micro-optical fibers in this prior art device.

Light pulses emerging from read ports 24, 26, and 28 are directed toward a surface 30 in the direction indicated by arrows 32. Surface 30 includes specific reflective areas for encoding data relating to the position/motion of the surface. Alternatively, the surface may include a reflective background with light absorptive or transmissive areas being used to encode data. The reflective surface may also be interrupted by slots (not shown), so that the optical sensor system responds to the presence or absence of a reflection from surface 30. Light reflected from the surface travels as indicated by arrows 34, entering read ports 24, 26, and 28 in the opposite direction from which it previously energed. The reflected light is conveyed through the receive micro-optical fiber bundles 36, 38, and 40 for transmission over m receive optical fibers $R_1$, $R_2$ through $R_m$, indicated by reference numerals 42, 44, and 46, respectively.

In prior art optical sensor head 10, n transmit channels may be used to convey light pulses toward the surface, and m receive channels to convey the light reflected from surface 30 to a detector. Prior art optical sensors have also been made in which the bundles of micro-optical fibers conveying the light reflected from surface 30 are combined into a single optical fiber for transmission to the detector. Thus, for example, the 27 micro-optical fibers comprising each receive bundle 36, 38, and 40 could be combined into a single output port comprising 81 micro-optical fibers, coupled to a single receive optical fiber for transmission of the reflected signals to the detector.

Clearly, if only one receive optical fiber carries the modulated light pulses for all channels of data, the optical sensor system must include logic for determining the channel from which a reflected light pulse originated in the stream of light pulses conveyed over the receive optical fiber. This task can be accomplished by synchronous detection of the light pulses, i.e., by comparing the light pulse transmitted through one of the transmit optical fibers $T_1$ through $T_n$, with the occurrence of a return pulse in the pulse stream conveyed through the receive optical fiber, to determine in which channel a specific light pulse belongs. Alternatively, the time relationship of the light pulses transmitted over transmit optical fibers $T_1$ through $T_n$ can be used as a basis for interpreting the pulses conveyed over the receive optical fiber.

As explained above, the major problem with prior art optical sensor head 10 relates to the difficulty and cost of its construction, particularly with respect to the labor involved in fabricating each of the micro-optical fiber bundles used in the device. The cost of this labor is, of course, proportional to the number of channels provided in the optical sensor head, and becomes unacceptably high with optical sensor heads employing more than a few channels.

Figure 2:
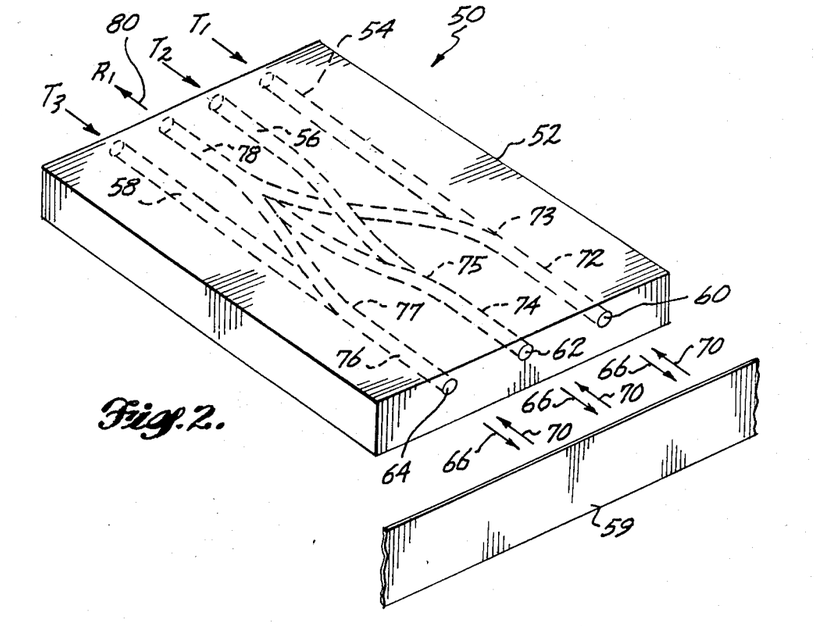
FIG. 2 is an isometric schematic representation of a first embodiment of a time division multiplexed waveguide optical sensor, in accordance with the present invention.

Turning now to FIG. 2, a first embodiment of a relatively low cost optical sensor head, produced with substantially less labor than required for the prior art optical sensor head described above, is schematically represented and generally denoted by reference numeral 50. Optical sensor head 50 employs ion diffused waveguide technology in which a plurality of waveguide channels are formed in a soda lime silicate glass substrate 52 using an ion diffusion process. The ion diffused waveguide channels are formed by exchaning ions in the soda lime silicate glass material with substitute ions, creating local regions of higher refractive index. For example, sodium ions in the substrate medium may be replaced with silver ions via the diffusion process to create the optical waveguide channel. Light injected into the higher refractive index of the channel is guided through that material, since the surrounding material of the substrate acts as a guiding boundary.

The relative size of the waveguide channel is an important factor, determining how much optical energy can propagate within the waveguide. Accordingly, it is desirable to fabricate a near circular waveguide to improve the coupling with an optical fiber terminated along an edge of the waveguide substrate. The size of the waveguide channel is determined by the depth that silver ions are diffused into the substrate. Until recently, ion diffusion depths in a substrate have been relatively low, so that only small diameter waveguide channels could be fabricated. The relatively small diameter of such waveguide channels resulted in a significant loss in coupling light from the larger diameter optical fibers typically used to convey light to and from the waveguide. Such losses were excessive, making this type of waveguide optical sensor too inefficient for practical use.

In a paper entitled "Channel Waveguides in Glass Via Silver-Sodium Field-Assisted Ion Exchange", published in the *Journal of Light Wave Technology*, Vol. LT-4, No. 2, February, 1986, by K. Forrest, S. Pagano, and W. Viehmann, a technique is described for field assisted diffusion of silver ions from vacuum evaporated silver films, into a substrate of soda-lime silicate glass, yielding relatively greater depths of diffusion, and thus larger diameter waveguides. The methods disclosed in the above-referenced paper have been sufficiently developed and refined, that waveguide having the appropriate diffused channel diameter and form necessary to produce optical sensor head 50 are commercially available from such companies as Opto-Electronics, Inc. of Oakville, Ontario, Canada, and Corning Glass Works of Corning, N.Y.

Optical sensor head 50 includes three channels for inputting light pulses, identified by $T_1$, $T_2$, and $T_3$. Although not shown in FIG. 2, the light pulses for each of these channels are conveyed through transmit optical fibers, the polished ends of which are directly butt coupled onto the side of the substrate 52, axially aligned with corresponding transmit waveguide channels 54, 56, and 58, respectively. Each of the transmit waveguide channels in the preferred embodiment conveys light pulses toward an opposite side of substrate 52 that is positioned proximate a moving element 59. Moving element 59 may be moving linearly, in a direction transverse to the planar surface of substrate 52, or may comprise a rotating member, e.g., a disc. The surface thus moves past spaced-apart read ports, disposed along the side of substrate 52. The transmit waveguide channels terminate at read ports 60, 62, and 64, from which light pulses conveyed through the transmit waveguide channels are separately emitted in the direction shown by arrows 66 to illuminate the surface of moving element 59. A reflective pattern applied to the facing surface of moving element 59 reflects the light pulses, thereby encoding information embodied in the reflective pattern. The reflected light pulses re-enter the same read port from which they were emitted, as shown by arrows 66.

The efficiency with which light emitted from the read ports illuminates a specific area of the surface of moving element 59 may be enhanced by including lenses at each read port to collimate or focus the light on the surface and to more efficiently gather the light reflected from the surface. Although such lenses are not illustrated, they may be butt coupled to the read ports or may be directly formed in waveguide substrate 52 by selectively controlled ion diffusion. If the optical sensor head is positioned in very close proximity to the adjacent surface, i.e., within a few thousandths of an inch, acceptable light coupling is achieved between the read ports and the surface without need for such lenses.

Part of the transmit waveguide channels 54, 56, and 58 proximate their distal ends, i.e., the ends which terminate at read ports 60, 62, and 64, comprises combined transmit/receive waveguide channels 72, 74, and 76, respectively. Light modulated by the reflective pattern on the surface of moving element 59 is conveyed in the opposite direction from which the transmitted light from the source first passed through the waveguide channel, and at asymmetrical splitter junctions 73, 75, and 77 is split off and continues to propagate into a branch of common receive waveguide channel 78. Asymmetrical splitter junctions 73, 75, and 77 are designed to direct up to 90% of the reflected light into receive waveguide channel 78, the remainder being lost or transmitted into the respective transmit waveguide channels 54, 56, and 58. The manner in which the asymmetrical junctions are formed in the substrate is well known to those of ordinary skill in the art. Receive waveguide channel 78 thus acts to combine most of the light reflected back from the surface of moving element 59 into a common receive waveguide channel, which is coupled to a receive optical fiber (not shown in FIG. 2) for transmission back to a detector in the direction indicated by the arrow representing receive optical fiber 80. Although three transmit optical fibers are required for this embodiment, only one receive optical fiber is needed to convey light reflected from the surface and encoded by its data, as indicated by $R_1$ in the figure.

Optical sensor head 50 thus carries out the same functions as the prior art optical sensor head 10, but can be manufactured at substantially lower cost in volume using production line techniques to produce the transmit and receive waveguide channels in substrate 52. Moreover, due to the recent advances in fabricating relatively large diameter circular waveguide channels within a substrate, as described above, the efficiency of optical sensor 50 in transmitting light pulses used to illuminate the data on the surface of moving element 59, and in conveying the modulated light pulses reflected from the surface into a receive optical fiber is at least equal to prior art sensor head 10.

Although optical sensor 50 includes only three transmit channels, it should be apparent that additional transmit channels may be provided by including additional waveguide channels within substrate 52, each terminating at a corresponding read port. The return signals for the added data channels may all be combined into a single receive waveguide channel, or alternatively, multiple receive waveguide channels may be provided, simply by replicating or expanding the waveguide pattern shown in FIG. 2.

Figure 3:
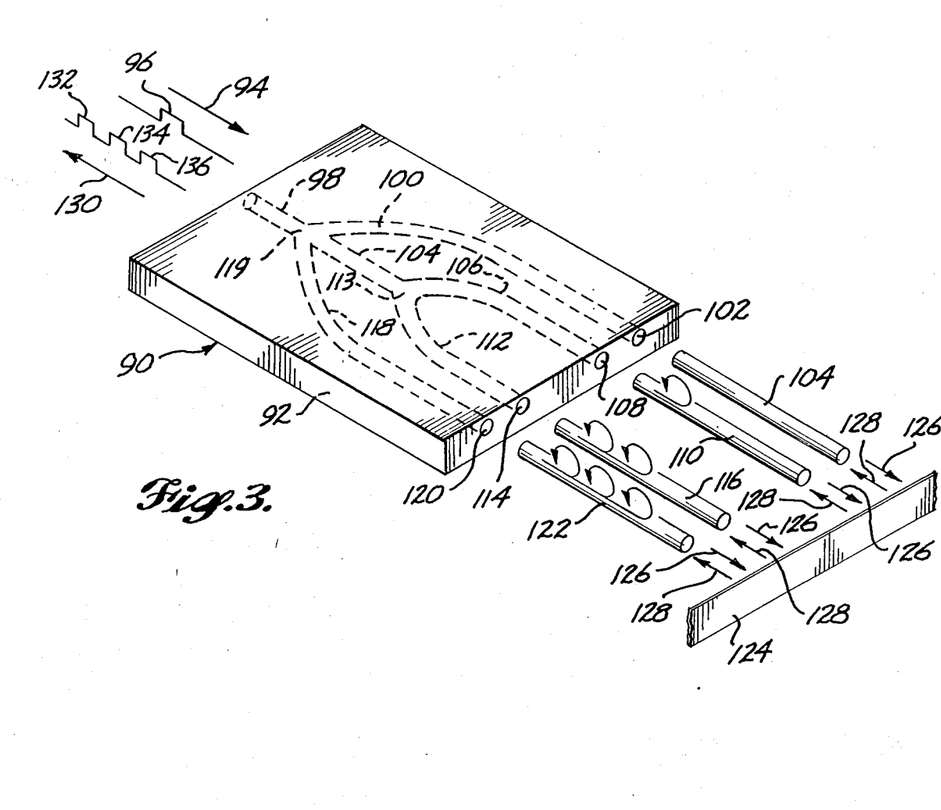
FIG. 3 is an isometric schematic representation of a second embodiment of the optical sensor in which a light pulse is optically delayed to produce a time division multiplexed signal.

A second embodiment of the optical sensor head is shown in FIG. 3, generally identified by reference numeral 90. The second embodiment also includes a soda lime silicate glass substrate 92 in which are formed a plurality of waveguide channels, using the above described ion diffusion technique. Light pulses are conveyed into optical sensor 90 in the direction identified by arrow 94. Unlike optical sensor head 50, the second embodiment receives a series of light pulses spaced apart in time, one of the light pulses 96 being shown graphically at the point in which it enters a combined transmit/receive waveguide channel 98. Waveguide channel 98 branches into three other combined transmit/receive waveguide channels 100, 104, and 118, at an asymmetrical splitter junction 119.

In the preferred embodiment, approximately 25% of the light propagating from a source in the direction of arrow 94 splits into each of waveguide channels 100 and 118, the remaining 50% being transmitted through waveguide channel 104. The portion of light transmitted through waveguide channel 100 from the splitter junction has the same shape and duration as the source light pulse input to waveguide channel 98, but it has approximately 25% of the source pulse amplitude. This pulse of light is conveyed through waveguide channel 100, to its distal end, terminating at a read port 102. Similarly, the light pulse conveyed through waveguide channel 118 has an amplitude equal to 25% of the amplitude of the source light pulse input at waveguide channel 98, and is conveyed to a read port 120 at the distal end of waveguide channel 118.

Waveguide channel 104 divides symmetrically at a splitter junction 113 into combined transmit/receive waveguide channels 106 and 112, such that each of those waveguide channels convey a pulse of light having an amplitude that is 25% of that entering waveguide channel 98. Waveguide channels 106 and 112 respectively terminate at their distal ends in read ports 108 and 114.

Read port 102 is directly butt coupled to an optical fiber 104, such that light pulses may bidirectionally pass to and from the read port and the optical fiber. Similarly, each of read ports 108, 114, and 120 are directly butt coupled to optical fiber delay lines 110, 116, and 122, respectively. The optical fiber delay lines introduce a predetermined time delay in the propagation of a light pulse passing therethrough, which is an increasing integer multiple for each successive delay line from 110 through 122. For example, optical fiber delay line 110 introduces a delay of 50 nanoseconds between the time that a light pulse enters the end coupled to read port 108 and exists at its opposite end; optical fiber delay line 116 introduces a time delay of 100 nanoseconds; and optical fiber delay line 122 introduces a delay of 150 nanoseconds. The various time delays are developed by providing successively more loops, i.e., a longer length of opticalfiber through which the pulses must propagate.

Light emitted from the polished distal ends of optical fiber 104 and optical fiber delay lines 110, 116, and 122 travels in the direction indicated by arrows 126 to illuminate an adjacent surface of a moving element 124. Moving element 124 either moves linearly in a direction transverse to a line extending through the ends of the optical fiber and each optical fiber delay line, or rotates transversely past their ends. A reflective pattern applied to the surface of moving element 124 reflects light pulses emitted from optical fiber 104 and the optical fiber delay lines, and the reflected light pulses travel in the direction indicated by arrows, 128, back into the adjacent ends of these elements. The light pulses traveling through optical fiber delay lines 110, 116, and 122 thus incur the same delay that they incurred when traveling in the opposite direction, and enter read ports 108, 114, and 120 at successively later times than the pulse entering read port 102. For optical fiber delay lines having the time delay interval described above, a light pulse entering read port 108 would be delayed by 100 nanoseconds (relative to a corresponding pulse entering read port 102); the pulse entering read port 114 would be delayed by 200 nanoseconds; and the pulse entering read port 120 would be delayed by 300 nanoseconds.

Light reflected back from the surface of moving element 124 for the corresponding data channels passes in the opposite direction through waveguide channels 100, 106, 112, 118, and 104, finally entering waveguide channel 98. Splitter junctions 113 and 119 now function as combiner junctions, operative to combine receive light signals reflected from moving element 124 into a single waveguide channel 98. Accordingly, a receive light signal traveling through waveguide channel 98 exists substrate 92 traveling in the direction indicated by arrow 130 and includes each of the pulses reflected from the surface of moving element 124, spaced apart in time as determined by the delay introduced by optical fiber delay lines 110, 116, and 122. A sequence of light pulses 132, 134, and 136 output from waveguide channel 98 are graphically represented in FIG. 3 to illustrate the time sequence of light pulses that would be produced as reflective areas on moving element 124 pass beneath the distal ends of optical fiber 104 and of optical fiber delay lines 110 and 116. Since, in the example, a reflective area on moving element 124 did not pass the distal end of optical fiber delay line 122 when the delayed light pulse was emitted from it, there is no light pulse in the illustrated sequence for that channel of data.

Although four channels of data can be encoded by the time division multiplex arrangement comprising optical sensor head 90 shown in FIG. 3, it may be preferably to provide only three channels of information, using the light pulse conveyed through optical fiber 104 to define a start bit for each sequence of the other three channels of light pulse data. Accordingly, each sequence of from 0 to 3 pulses of light reflected from the surface of moving element 124 would include a start bit reflected from that surface through optical fiber 104, with each reflected light pulse representing a logical "0" or a "1" for the three channels of data. Alternatively, an electronic timer can be used to differentiate which of the four channels includes a reflected pulse from the surface of moving element 124. It should be apparent that more than three or four channels of data may be provided by adding additional waveguide channels within substrate 92 to convey light bidirectionally for each of the added channels of data. The intensity of the transmit light pulse entering the substrate from the source is a practical limitation on the number of channels in this embodiment, since further splitting of the source light pulse reduces the amplitude of the light pulse emitted from the read port of each data channel.

Figures 4, 5, 6:
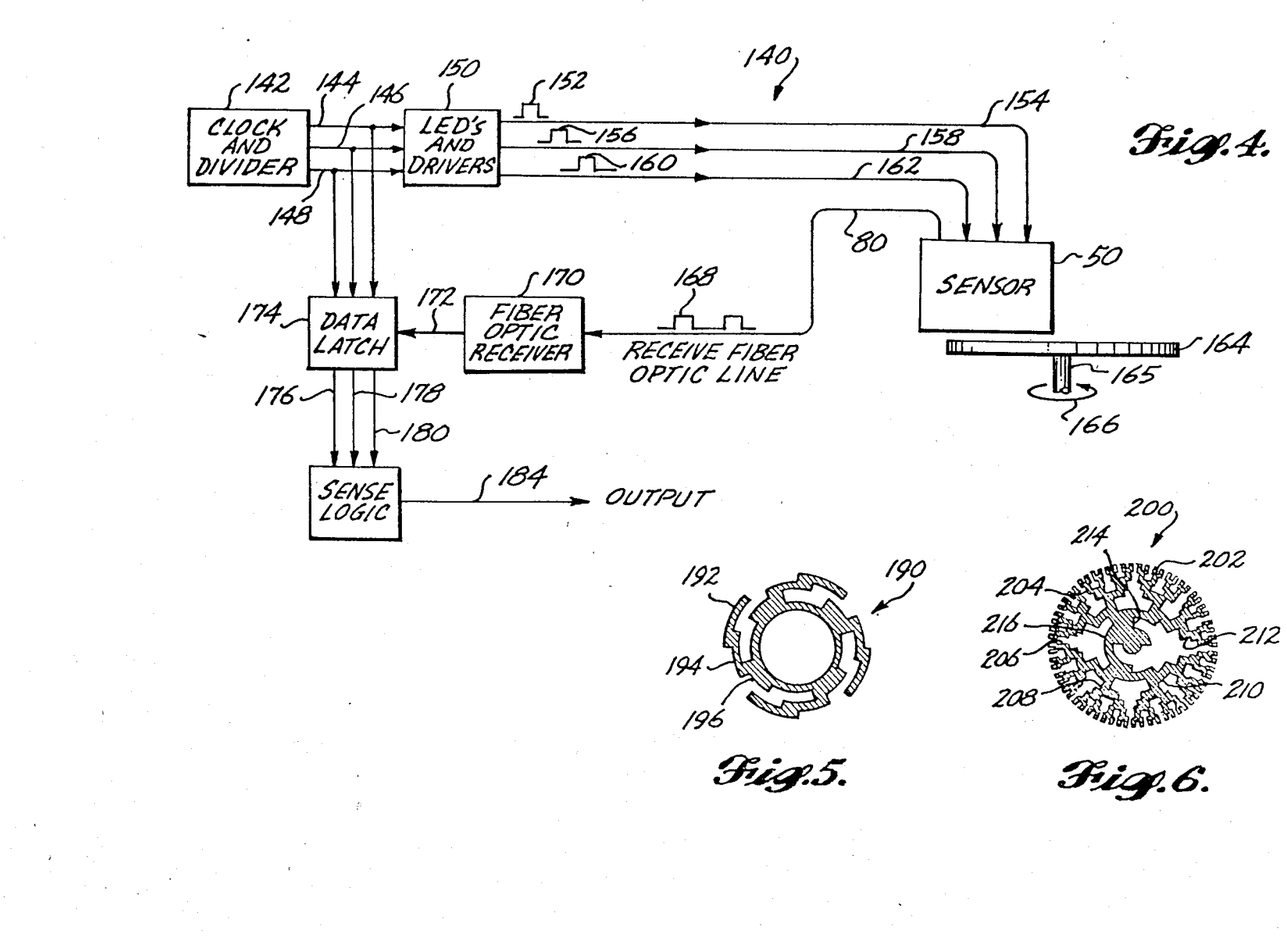
FIG. 4 is a block diagram of a preferred embodiment of the optical sensor system.
FIG. 5 is a plan view of a reflective pattern applied to a rotatable disc, in which three channels of data are provided.
FIG. 6 is a plan view of an eight channel reflective pattern used to encode data on a rotatable disc.

Referring now to FIG. 4, an optical sensor system 140 includes the first embodiment of optical sensor head 50, as described above. A Clock and Divider Circuit 142 provides three electrical pulses at spaced-apart time intervals over leads 144, 146, and 148 which are input to an LED and Driver Circuit 150 and also to a Data Latch Circuit 174. LED and Driver Circuit 150 responds to the electrical pulses from Clock and Divider Circuit 142 by energizing each of three light emitting diodes (not shown separately), causing them to emit three pulses of light 152, 156, and 160, spaced apart by equal increments in time, corresponding to the three electrical pulses output from Clock and Divider Circuit 142. The light pulses output from LED and Driver Circuit 150 are conveyed over transmit optical fibers 154, 158, and 162 to optical sensor head 50. Waveguide channels within fiber-optic sensor 50 are not shown; however, based on the prior description of optic sensor head 50, it will be apparent that light pulses transmitted from transmit optical fibers 154, 158, and 162 emerge from the optical sensor head and illuminate the adjacent surface of a rotating disc 164, which is connected to a shaft rotating in the direction shown by arrow 166. The adjacent surface of disc 164 includes a pattern of reflective areas, in which data is encoded with respect to the reflection, absorption, or transmission of light by or through specific portions on the disc passing beneath optical sensor head 50.

Reflective areas on the top surface of disc 164 are preferably used to encode the data. These reflective areas comprise a layer of gold or other highly specular material such as stainless steel or polished aluminum, which has been deposited on the surface of the disk in a vacuum (or the disk may comprise a material such as stainless steel, which is highly polished where light reflectivity is desired). The background of the reflective areas on the disc preferably has a very high coefficient of light absorption, creating a high specular contrast or reflectance ratio between the light reflective and light absorptive areas on the disc surface. Light pulses reflected from the reflective areas on the surface of rotating disc 164 are combined into a single data signal on receive optical fiber 80, represented graphically, for example, as a series of spaced-apart light pulses 168 that are transmitted to a fiber-optic receiver 170. It should be apparent that if the reflective areas on the surface of rotating disc 164 corresponding to the three data channels pass under a read port at the time that pulses of light propagating down transmit optical fibers 154, 158, and 162 emerge from the optical sensor head, the light pulse train transmitted over receive optical fiber 80 will include three light pulses spaced apart by an equal increment in time, representing the data encoded in the reflective areas on the disc. Conversely, if an area that absorbs (or transmits) light passes under one of the read ports on the optical sensor head, the light pulse for that channel is not reflected back and does not appear in the sequence of light pulses propagating through receive optical fiber 80.

Fiber-optic receiver 170 includes an optical detector, for example, an avalanche or PIN photodiode (not shown separately) or other similar light sensor, for producing an electrical signal corresponding to the intensity of light to which it is exposed. Receive optical fiber 80 is optically coupled to fiber-optic receiver 170. The fiber-optic receiver produces an electrical output pulse corresponding to each of the light pulses conveyed through the receive optical fiber. The electrical pulses output from fiber-optic receiver 170 are transmitted through a lead 172 into data latch 174. Data latch 174 includes a circuit that "passes through" the electrical pulses present on leads 144, 146, and 148 only if they correspond in time to the sequence of electrical pulses produced by fiber-optic receiver 170 in response to the receive light pulses output from optical sensor head 50. Accordingly, an electrical pulse is output from data latch 174 on leads 176, 178, and 180 corresponding to each of the light pulses on receive optical fiber 80. These electrical pulses are input to a Sense Logic Circuit 182, which decodes the data represented by the electrical pulses, corresponding to the encoded data on the surface of rotating disc 164. Sense Logic Circuit 182 thus determines the position, and/or speed and direction of rotation of rotating disc 164, based on the relationship of the pulses input over leads 176, 178, and 180. The information derived from the pulses input to Sense Logic Circuit 182 is output over a lead 184 to an end use device (not shown), serving for example, as a feedback signal to control the position and/or velocity of a shaft 165 to which disc 164 is connected and by which it is rotatably driven.

A typical reflective pattern 190 representing three channels of data encoded on the upper surface of rotating disc 164 is shown in FIG. 5. First, second, and third reflective areas 192, 194, and 196, respectively, each represent one of the channels of data encoded by pattern 190. The duration of the light pulses and the spacing between each of the light pulses affects the resolution with which the angular position of a disc on which pattern 190 is resolved if the pattern is in motion.

Relatively greater resolution can be obtained by using additional channels, but each additional channel requires an additional input pulse be provided through an additional transmit optical fiber and read port. An encoded pattern 200 is shown in FIG. 6 in which reflective areas 202 through 216 provide eight channels of data to an optical sensor having eight read ports. While an optical sensor head for use with an eight channel pattern is not shown, it should be apparent, as already explained, that optical sensor head 50 may be expanded to include various additional channels of data by adding correspondingly more transmit waveguide channels to convey the required number of light pulses input, and by combining the receive optical waveguide channels into one or more receive optical waveguide channels for output to an appropriate number of receive optical fibers. As an alternative to providing a light absorbing background, a slotted disc may be used having, for example, alternate 45° sectors cut-away, withthe remaining surface coated (or polished) to provide relatively high light reflectivity. Analog data may also be encoded on an adjacent surface monitored by the optical sensor using variably reflective or transmissive areas, thereby producing reflected pulses that vary in amplitude in either discrete steps or over a continuous range.

While the present invention has been disclosed with respect to several preferred embodiments, those of ordinary skill in the art will appreciate that further modifications may be made within the scope of the claims that follow below. Accordingly, it is not intended that the scope of the invention should in any way be limited by the disclosure, but that it be determined entirely by reference to the claims.

The embodiments of the invention in which an exclusive property or privilege is claimed are defined as follows:

1. An optical sensor for monitoring an adjacent surface, comprising:
   at least one transmit optical fiber through which light from a remote source is transmitted;
   at least one receive optical fiber connected to an optical detector; and
   an optical waveguide having at least one channel connected to said at least one transmit optical fiber and operative to transmit light from the remote source, said light emerging from the optical waveguide through a plurality of spaced-apart points disposed adjacent the surface,
   and after emerging from the optical waveguide, being reflected from said surface and re-entering the optical waveguide through the spaced-apart points, propagating through the optical waveguide along at least one other channel and exiting through said at least one receive optical fiber for transmission to the optical detector.

2. The optical sensor of claim 1, wherein a separate transmit optical fiber and channel in the waveguide are provided for each of the spaced-apart points through which light energes.

3. The optical sensor of claim 2, wherein the light emerging from the optical waveguide that is reflected from the surface re-enters the waveguide and propagates along a portion of the same channels along which it traveled prior to emerging from the optical waveguide, but in the opposite direction, and then splits off into said at least one other channel that conveys the light to said at least one receive optical fiber.

4. The optical sensor of claim 3, wherein a separate receive optical fiber and other channel are provided for each of said spaced-apart points through which light re-enters the waveguide.

5. The optical sensor of claim 1, wherein light propagating through the waveguide from said at least one transmit optical fiber is split into a plurality of channels, each conveying a portion of the light to said spaced-apart points from which it exists the waveguide.

6. The optical sensor of claim 5, wherein said at least one transmit and said at least one receive optical fiber comprise a common optical fiber, said light reflecting from the surface being combined in a common channel connected to the common optical fiber.

7. The optical sensor of claim 6, further comprising a plurality of optical delay lines, each being interposed between one of said spaced-apart points on the optical waveguide and the surface, said optical delay lines introducing a different time delay with respect to light entering each of said spaced-apart points, so that the light propagating toward the optical detector conveys time division multiplexed data.

8. The optical sensor of claim 1, wherein the surface is optically encoded by including areas of varying optical reflectance.

9. The optical sensor of claim 1, wherein the surface is optically encoded by including areas of varying optical transmissivity.

10. An optical sensor for sensing data on a surface, comprising:

(a) n transmit optical fibers operative to convey light from a source toward an optical waveguide, n being an integer number at least equal to one;

(b) m receive optical fibers operative to convey light from the optical waveguide to an optical detector associated with each receive optical fiber, m being an integer number at least equal to one;

(c) said optical waveguide including n transmit channels for conveying light through the optical waveguide, each transmit channel being connected to one of the transmit optical fibers, and a plurality of receive channels connected to the m receive optical fibers, each receive channel being joined with one of the transmit channels, light from the source exiting the waveguide and propagating toward data on the surface through a plurality of spaced-apart points, light reflected back from said surface re-entering the waveguide at said spaced-apart points and being conveyed along said receive channels, and through said m receive optical fibers to said optical detector.

11. The optical sensor of claim 10, wherein there is only one receive optical fiber and wherein the receive channels are combined so that the light reflected from the surface into each of the receive channels enters the receive optical fiber as a combined data signal.

12. The optical sensor of claim 10, wherein the transmit optical fiber and the receive optical fiber comprise a single common optical fiber through which light propagates bidirectionally from the source and from the optical waveguide.

13. The optical sensor of claim 12, wherein light propagating from the source through the waveguide is split into a plurality of transmit channels comprising paths connected to the spaced-apart points, and light reflected from the surface re-enters the spaced-apart points and propagates in the opposite direction along said paths, exiting through the common optical fiber, said transmit and return channels comprising common channels in the waveguide.

14. The optical sensor of claim 13, wherein the light from the source is split asymmetrically between transmit channels at least once as it propagates through the waveguide.

15. The optical sensor of claim 13, further comprising time division multiplexing means disposed between the spaced-apart points on the waveguide and the surface, for introducing different time delays in pulses of light propagating toward the surface.

16. The optical sensor of claim 15, wherein the time division multiplexing means comprise a plurality of optical fiber delay lines.

17. The optical sensor of claim 10, wherein the spaced-apart points are disposed along one side of the waveguide proximate the data on the surface, and wherein there is relative motion between the surface and the waveguide.

18. The optical sensor of claim 10, further comprising a plurality of lenses, each lens being interposed between one of the spaced-apart points and the surface and operative to collimate the light emerging from the spaced-apart points and to gather light reflected from the surface back into the spaced-apart points.

19. The optical sensor of claim 10, wherein the data is encoded by varying the optical reflectance of portions of the surface.

20. An optical sensor disposed adjacent a surface on which data is optically encoded by varying the reflectance of light from the surface, comprising:

an optical waveguide, said optical waveguide including a plurality of first path means, defined by regions of relatively higher refractive index within a substrate having a lower refractive index, for conveying light originating from an external source through the waveguide toward the surface, and second path means defined by regions of relatively higher refractive index compared to the refractive index of the substrate, for conveying light reflected from said surface through the waveguide toward a light detector, at least a portion of the first path means being coincident with the second path means, so that light passes bidirectionally through said portion.

* * * * *

UNITED STATES PATENT AND TRADEMARK OFFICE
CERTIFICATE OF CORRECTION

PATENT NO. : 4,906,837

DATED : March 6, 1990

INVENTOR(S) : Doneen et al.

It is certified that error appears in the above-identified patent and that said Letters Patent is hereby corrected as shown below:

| Column | Line | Error |
|---|---|---|
| 3 | 6 | "micor-optical" should be --micro-optical-- |
| 3 | 9 | "inthe" should be --in the-- |
| 3 | 15 | "238" should be --38-- |
| 4 | 14 | "exchaning" should be --exchanging-- |
| 4 | 50 | "waveguide" should be --waveguides-- |
| 6 | 68 | "opticalfiber" should be --optical fiber-- |
| 7 | 51 & 52 | "pref-erably" should be --preferable-- |
| 9 | 55 | "withthe" should be --with the-- |
| 11 | 9 | "lightthrough" should be --light through-- |

Signed and Sealed this

Twenty-fourth Day of September, 1991

Attest:

HARRY F. MANBECK, JR.

*Attesting Officer*  *Commissioner of Patents and Trademarks*